(12) United States Patent
Naghib et al.

(10) Patent No.: US 12,074,445 B1
(45) Date of Patent: Aug. 27, 2024

(54) SCHEDULING DELIVERY OF ENERGY ASSOCIATED WITH ENERGY ATTRIBUTE CERTIFICATES FROM NETWORKED RENEWABLE ENERGY POWER PLANTS

(71) Applicant: 8ME NOVA, LLC, El Dorado Hills, CA (US)

(72) Inventors: Elahesadat Naghib, Seattle, WA (US); Thomas Buttgenbach, Santa Monica, CA (US)

(73) Assignee: 8ME NOVA, LLC, El Dorado Hills, CA (US)

( * ) Notice: Subject to any disclaimer, the term of this patent is extended or adjusted under 35 U.S.C. 154(b) by 0 days.

(21) Appl. No.: 18/466,292

(22) Filed: Sep. 13, 2023

(51) Int. Cl.
    H02J 3/46 (2006.01)
    G06Q 10/04 (2023.01)
    G06Q 10/1093 (2023.01)
    G06Q 50/06 (2012.01)
    H02J 3/00 (2006.01)
    H02J 3/32 (2006.01)
    H02J 3/38 (2006.01)

(52) U.S. Cl.
    CPC .............. *H02J 3/466* (2020.01); *G06Q 10/04* (2013.01); *G06Q 10/1093* (2013.01); *G06Q 50/06* (2013.01); *H02J 3/003* (2020.01); *H02J 3/004* (2020.01); *H02J 3/0075* (2020.01); *H02J 3/32* (2013.01); *H02J 3/381* (2013.01); *H02J 2203/10* (2020.01); *H02J 2300/24* (2020.01)

(58) Field of Classification Search
    CPC ....................................... H02J 3/466
    See application file for complete search history.

(56) References Cited

U.S. PATENT DOCUMENTS

| | | | |
|---|---|---|---|
| 11,171,485 B1 * | 11/2021 | Ramesh | H02J 3/381 |
| 11,588,329 B2 * | 2/2023 | Zanone | H02S 40/38 |
| 11,715,952 B2 * | 8/2023 | Gokhale | G06Q 50/06 |
| | | | 705/412 |
| 11,721,982 B1 * | 8/2023 | Buttgenbach | H02J 3/381 |
| | | | 290/7 |
| 2015/0364919 A1 * | 12/2015 | Schumer | H02J 3/28 |
| | | | 700/291 |
| 2016/0211664 A1 | 7/2016 | Subbotin et al. | |
| 2017/0003700 A1 * | 1/2017 | Pavlovski | H02J 3/003 |
| 2018/0366951 A1 * | 12/2018 | Viehweider | H02J 3/00 |

(Continued)

FOREIGN PATENT DOCUMENTS

EP    4 231 477 A1    8/2023

*Primary Examiner* — Nathan L Laughlin
(74) *Attorney, Agent, or Firm* — Foley & Lardner LLP

(57) ABSTRACT

Methods and systems determine an energy delivery schedule for a first renewable energy power plant (REPP) and a second REPP connected to an energy grid at different points of delivery. The method includes forecasting energy production by a first REPP and a second REPP during a time period; identifying one or more possible delivery schedules for the first REPP and the second REPP; forecasting energy demand corresponding to points of delivery at the energy grid to which energy produced by the first REPP and the second REPP are provided; selecting a delivery schedule from the one or more possible delivery schedules for the first REPP and the second REPP; and sending a first control signal to the first REPP and a second control signal to the second REPP to implement the selected delivery schedule at the first REPP and the second REPP.

21 Claims, 6 Drawing Sheets

(56) References Cited

U.S. PATENT DOCUMENTS

2023/0073358 A1    3/2023  Gruber et al.
2023/0129279 A1*  4/2023  Buttgenbach ......... H02J 15/008
                                                              307/18

* cited by examiner

SCHEDULING DELIVERY OF ENERGY ASSOCIATED WITH ENERGY ATTRIBUTE CERTIFICATES FROM NETWORKED RENEWABLE ENERGY POWER PLANTS

BACKGROUND

Electricity users, who want to use renewable electricity, generally cannot do so by connecting directly to a renewable power plant. As a practical matter, most electricity consumers must get their electrical power from a grid. Energy drawn from an electrical grid usually commingles electricity generated by renewable and non-renewable sources. However, electricity generators can obtain a third-party certificate of having delivered renewable electricity to the grid (an Environmental Attribute Certificate, or EAC). An example is the Renewable Energy Credit (REC) system widely used in the United States.

A renewable energy generator delivers electricity to the grid and creates RECs. The renewable electricity user purchases these RECs (or other certificates) and "retires" them as the renewable energy generator draws electricity from the grid. By matching the RECs and the electricity consumption, the energy consumer can effectively claim to be consuming renewable energy only.

An important issue about "matching" the RECs and electricity consumption relates to the timing when the electricity is delivered and consumed. Electricity delivered to the electrical grid must be consumed—by some consumer, somewhere—within about 10 milliseconds. Renewable energy may be more readily produced at some times, while demand may be high at other times. For example, solar energy can only be produced during daylight hours, while demand may be high into the early evening hours. Therefore, some of the renewable energy may need to be produced at one time, stored in an Energy Storage System (ESS), and delivered to the electrical grid at a later time. However, ESS capacity is costly, so, ideally, any consumer wishing to consume renewable electricity should ensure not only that the quantities of electricity and RECs match, but also that the RECs are created at approximately the same time as the energy is consumed. In practice, "approximately the same time" may be a large time window. However, many in the renewable electricity industry expect that, over time, the relevant window will narrow.

If the renewable electricity producer has more than one renewable energy power plant (REPP) connected to the grid, then in a time window when both REPPs could deliver energy to the grid, the producer may decide to use either one—or both—to deliver electricity and generate RECs. This disclosure describes systems and methods for choosing which REPP should create the required RECs by delivering electricity to the grid during each time window.

BRIEF DESCRIPTION OF THE DRAWINGS

Aspects of the present disclosure are best understood from the following detailed description when read with the accompanying figures. It is noted that, in accordance with the standard practice in the industry, various features are not drawn to scale. In fact, the dimensions of the various features may be arbitrarily increased or reduced for clarity of discussion.

DETAILED DESCRIPTION

Figure 1:
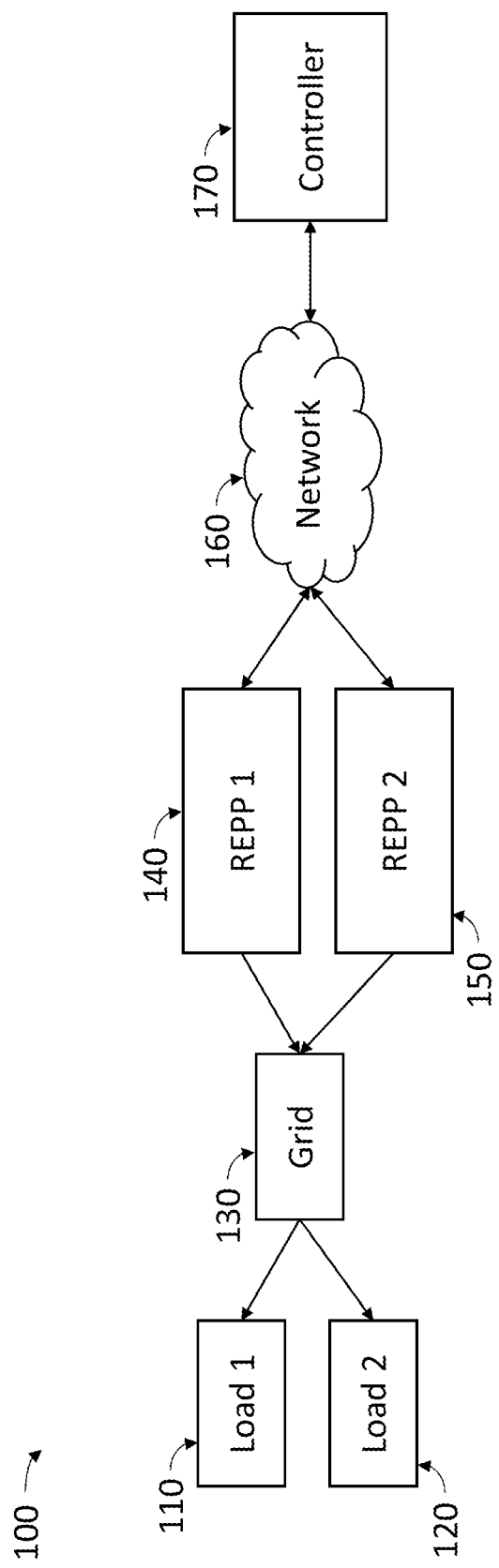
FIG. 1 illustrates an example environment of renewable energy power plants (REPPs) in accordance with one or more embodiments.

Embodiments of the present disclosure allow for optimal scheduling of energy delivery for one or more renewable energy power plants connected to an electric grid. For purposes of this description, a renewable energy power plant (REPP) includes a renewable energy source (RES) and an energy storage system (ESS). The electricity production capacity of the RES may be variable and/or intermittent. For example, the RES may be a number of wind turbines whose electricity production capacity depends on the wind strength; or the RES may be a solar array whose electricity production capacity depends on sunshine (which may be affected by time of day, time of year, and weather conditions).

An operator of one or more REPPs may have requirements to deliver particular quantities of renewable energy (i.e., deliver electricity to the grid and create RECs) during particular windows of time. These windows may be for one or more years, months, days, hours, or even 15-minute intervals. The contractual obligations may be of almost any length, from short-term to very long-term. Long-term contractual obligations (years in duration) are often referred to as Power Purchase Agreements (PPAs) and REPPs whose output is largely accounted for by PPAs are said to be "under PPA". Short-term contractual obligations (minutes to hours) are often referred to as "merchant sale agreements" or "merchant sales" and REPPs whose output is largely accounted for by merchant sales are said to be "merchant plants".

A buyer of renewable energy is a) consuming energy from the electrical grid and b) retiring RECs. The buyer may contract separately for these. The buyer may buy electricity from a grid operator or utility and buy RECS from a renewable energy generator on the same grid. Similarly, the producer of renewable energy—the REPP operator—may sell the RECs and the delivered electricity separately: the RECs are sold to the renewable energy consumer, while the electricity is sold to a grid operator or utility (more generally, to a "load serving entity" (LSE) responsible for procuring electricity for end-users on the grid). A grid may have one or more LSEs; and where there is more than one LSE, the producer of renewable energy may sell its electrical output to an LSE that is not the one selling electricity to the renewable energy consumer.

Electrical grid operators may have operational reasons to prefer that electricity should be delivered at some locations on their grid, relative to others. For example, as electricity travels through an electrical grid, some of the energy is lost as heat and/or as radiated energy. The longer the path traveled, the greater the energy loss. An electrical grid may extend over long distances, sometimes as much as hundreds of miles from one end to the other. Consequently, if there is a period when substantial increase in electrical load connected to the grid happens in one local area of the grid (the "load center"), all other things being equal it would be more efficient—incurring fewer energy losses—if the additional electrical supply to serve the increased load were connected relatively close to the load center.

As another example, an electrical grid may be thought of as a network that has transmission-line pathways connecting nodes. A node is a place where a) electricity can be delivered to the grid, b) electricity can be drawn from the grid, or c) transmission lines connect to each other. Each transmission-line pathway has electrical limits: typically a voltage limit and a current limit. These limits may be defined by many factors: the distance of the transmission line from nearby people or objects; the insulating capability of the insulators that hold the transmission line away from its support towers; the temperature limits of the transmission line or its supporting insulators; limitations of the equipment at either end of the transmission line, etc.

At some times, there may be parts of the electrical grid where, locally, more power is being drawn from the grid by end users than is being delivered to it. These areas may be called "load centers". At the same time, if electricity supplied to the grid is to balance the electricity demanded, there will be parts of the electrical grid where, locally, more power is being supplied to the grid than is being drawn from it by end users. These areas may be called "supply centers".

Finally, there will be transmission lines that connect supply centers to load centers, and electrical power will flow along them from the supply centers to the load centers. At certain times, the electrical power flow in these transmission lines will cause the lines to approach one or more electrical limits, and the lines will be said to be "congested"; in effect, the grid operator will prefer to avoid further increasing the electrical power flow in these transmission lines. When this happens, the grid operator will prefer that additional electrical supply should be added at the load-center end of the congested transmission line, and not at the remote supply-center end.

The grid operator may signal its location preference in a number of ways. If it controls the dispatch of power plants connected to the grid, it may increase the power output of plants connected in preferred locations and possibly also decrease the output of plants connected in non-preferred locations. These actions would mean that a power plant connected in a preferred location could, if it wished, increase the amount of power it delivers; while one connected in a non-preferred location might be unable to deliver as much power as it had anticipated.

Alternatively, the grid operator may "price" its location preferences by setting transmission prices for its transmission lines so that, for example, the price of sending energy down a transmission line from its current supply-center end to its current load-center end is high (but the price is low to send energy down the same line in the opposite direction because this would reduce the net power being transmitted on the line). These transmission prices would have the effect of causing electricity to have differing economic value depending on where it is delivered to the grid. The grid operator may optionally "price" its location preferences by communicating prices for electricity delivered at particular nodes of the grid.

A REPP operator who commits to deliver some quantity of RECs to a customer during a particular time window, may find that the grid operator is signaling that the place where that REPP connects to the grid is a non-preferred location for delivery of electricity to the grid during that same time window. This may either prevent the REPP operator from delivering electricity to the grid as needed to create the RECs, or may require the REPP operator to deliver electricity to the grid at highly unattractive prices (if the grid operator uses a pricing mechanism to signal delivery location preferences) in order to create the RECs it has committed to create and deliver.

FIG. 1 illustrates an example environment 100 including a first load 110, a second load 120, a grid 130, a REPP 140, a REPP 150, a network 160, and a controller 170 where a renewable energy producer operates REPP 140 and REPP 150. The renewable energy producer may commit to delivering at least a certain minimum quantity of renewable energy—and calculate and/or create a certain minimum quantity of RECs on that grid during a time window—and can choose how much of that energy will be delivered from each of the REPP 140 and the REPP 150. The renewable energy producer may calculate the minimum quantity of renewable energy as a function of the amount of renewable energy the renewable energy producer commits to delivering from the REPP 140 and the REPP 150, for example.

In some embodiments, the grid 130 may be a utility grid owned and operated by a single utility or system operator. In other embodiments, the grid 130 may be a plurality of electrical connections allowing for the transmission of power from the first REPP 140 and the second REPP 150 to the first load 110 and the second load 120.

Examples of REPPs include, but are not limited to, solar plants, wind plants, geothermal plants, and biomass plants. REPPs may include energy storage systems (ESSs). An example of an ESS is a battery. A battery-based ESS may be called a battery ESS or BESS. The first REPP 140 may have a first power output that varies over time. The second REPP 150 may have a second power output that varies over time. The first power output and the second power output may vary differently such that they are not tightly correlated. For example, the first REPP 140 may be geographically remote from the second REPP 150 such that weather patterns at the first REPP 140 differ from weather patterns at the second REPP 150. Thus, variation in the first power output will not be tightly correlated with variation in the second power output. The less correlated the output of the first REPP 140 with the output of the second REPP 150, the greater the effects of networking. The less correlated the outputs of the first REPP 140 and the second REPP 150, the less variation will be present in the combined output of the first REPP 140 and the second REPP 150. Less variation in the combined output may result in more reliability in satisfying the power delivery profiles of the first load 110 and the second load 120. Less variation in the combined output may result in lower capacity requirements for the first REPP 140 and the second REPP 150.

The first REPP 140 and the second REPP 150 may communicate with a controller 170 via a network 160. The network 160 may be any local area network (LAN) or wide area network (WAN). In some embodiments, the network is the internet. In other embodiments, the network is a private communications network. The controller may include a processor and a memory.

The controller 170 may control the first REPP 140 and the second REPP 150. The controller 170 may coordinate the first power output of the first REPP 140 and the second power output of the second REPP 150 in order to deliver power (or RECs or other EACs) to the first load 110 and the second load 120. The controller 170 may receive the first power delivery profile of the first load 110 and the second power delivery profile of the second load 120. In some embodiments, the controller 170 receives the first power delivery profile from the first load 110 and the second power delivery profile from the second load 120 via the network 160. In other embodiments, the controller 170 receives the first power delivery profile and the second power delivery profile from another source. The controller 170 may direct the first REPP 140 to direct power to the first load 110 or the second load 120. The controller 170 may direct the second REPP 150 to direct power to the first load 110 or the second load 120. The controller 170 may direct the first REPP 140 to direct a first portion of its power output to the first load 110 and a second portion of its power output to the second load 120. The controller 170 may direct the second REPP 150 to direct a third portion of its power output to the first load 110 and a fourth portion of its power output to the second load 120. In some embodiments, directing power from a power plant to a load is accomplished by sending power from the power plant to the grid and communicating to the load how much power was sent to the grid. The load draws power from the grid equal to how much power the power plant sent to the grid. The load may match its energy consumption in a time window to the energy sent from the power plant to the grid in the time window. The time window may be a year, a month, a day, an hour, a minute, or any other unit of time. Where power is directed to the load from multiple power plants, the load may match its power consumption in a time window to the total power sent by the multiple power plants in the time window. Responsive to determining the load needs to consume or consumes more energy than the total energy sent by the multiple power plants in the time window, the load operator may draw energy from other sources (which may not be renewable) and keep a record of the portion of energy consumed from the multiple power plants and from the other sources respectively, as input to an algorithm that will adjust its future requests for energy from the multiple power plants. The controller 170 or the load operator may determine the load needs to consume or consumes more energy than sent by the multiple power plants as a difference between the total amount of energy the load needs to consume or consumes and a portion of a combined power output of the multiple power plants that is communicated to the load.

The controller 170 may direct the first REPP 140 and the second REPP 150 to direct power to the first load 110 and the second load 120 to satisfy the first power delivery profile and the second power delivery profile. If the power output of the first REPP 140 is sufficient to satisfy the first power delivery profile of the first load 110 and the power output of the second REPP 150 is sufficient to satisfy the second power delivery profile of the second load 120, the controller 170 may direct the first REPP 140 to direct sufficient power to the first load 110 to satisfy the first power delivery profile and direct the second REPP 150 to direct sufficient power to the second load 120 to satisfy the second power delivery profile. If the power output of the first REPP 140 is insufficient to satisfy the first power delivery profile of the first load 110 and the power output of the second REPP 150 is sufficient to satisfy the second power delivery profile of the second load 120, the controller 170 may direct the first REPP 140 to direct its power output to the first load 110 and direct the second REPP 150 to direct sufficient power to the second load 120 to satisfy the second power delivery profile and an amount of power to the first load 110 sufficient, when combined with the power output of the REPP 140, to satisfy the first power delivery profile of the first load 110. Since the power outputs of the first REPP 140 and the second REPP 150 are not correlated, it is likely that if the power output of the first REPP 140 is insufficient to satisfy the first power delivery profile, the second REPP 150 has sufficient power output in excess of what is required by the second power delivery profile to supplement the power output of the first REPP 140 to satisfy the first power delivery profile.

In the environment 100, the REPP operator can commit to produce RECs during a specified time window for two or more REPP's (e.g., the REPPs 140 and 150) that the REPP operator controls or operates. The REPP operator can do so by transmitting a message to the utility grid indicating the commitment, for example. This commitment to produce RECs implies a commitment to deliver electricity to the same grid, during the same time window—but the commitment may not indicate which REPP will deliver the electricity and create the RECs. The REPP operator can then, later, choose which REPP(s) will deliver electricity to the grid and thus create or generate the RECs. The choice of REPP(s) can be based on the local needs of the grid, delivering the electricity from the REPP best located to meet those needs. Where a grid operator or other entity provides location-based energy prices and/or transmission prices to signal the spatial needs of the grid (e.g., higher priced energy may correspond to locations of the grid in which more energy is needed or vice versa), the REPP operator may use that pricing information to identify the best located REPP, such as by supplying energy to the grid from the REPP connected to the grid at a location in which the price is higher or the highest. Where a grid operator or other entity controls dispatch based on offers of electricity supply, the REPP operator may make offers of electricity supply that make it most likely the grid operator will dispatch those REPPs the REPP operator or grid operator believes to be best located.

Advantageously, the REPP operator may determine, ahead of time, how much renewable energy to commit to delivering from each of the two or more REPPs. The REPP operator may do so by forecasting potential energy production by each RES for a forecast period including at least the time window (but possibly much longer). The REPP operator may identify a set of possible delivery schedules for each REPP during the forecast period. In some cases, the REPP operator may do so such that none of the possible delivery schedules cause the ESS in an REPP to exceed any of the ESS's power or state of charge limits. The REPP operator may forecast energy demand (and/or projected pricing) corresponding to each of the REPPs' points of delivery to the grid. The REPP operator may choose a set of delivery schedules for the REPPs that together maximize a measure of fit between energy deliveries and energy demand at each point of delivery (the measure of fit may be total revenues, for example, if the grid operator uses an energy pricing and/or transmission pricing system). The point of delivery can be or include a point of interconnect between the REPP and the energy grid. The REPP operator may minimize a measure of the risk of being unable to deliver the full committed quantity of electricity (and create the corresponding quantity of RECs). The measures of fit and risk may be combined into a single overall score (e.g., by creating a weighted sum of the individual scores). The set of delivery schedules may be chosen to maximize (or minimize, as appropriate) the single overall score.

In addition, the REPP operator may take steps to cause the REPPs to be dispatched according to the chosen delivery schedules. These steps may depend on the methods used by the grid operator to select power plants for dispatch. For example, the grid operator may accept bids from power plant operators to supply specific amounts of energy during upcoming time periods at specified minimum prices. The grid operator may then select power plants for dispatch that satisfy the operational needs of the grid at the lowest total cost. Accordingly, the REPP operator may submit price/quantity bids for each of the REPPs, where those bids are chosen to maximize the likelihood of the REPPs being dispatched in accordance with the chosen delivery schedules. However, this is just an example. There may be other procedures by which the system operator selects power plants for dispatch, and the REPP operator may take whatever steps appear likely to achieve the desired delivery schedules.

Figure 2:
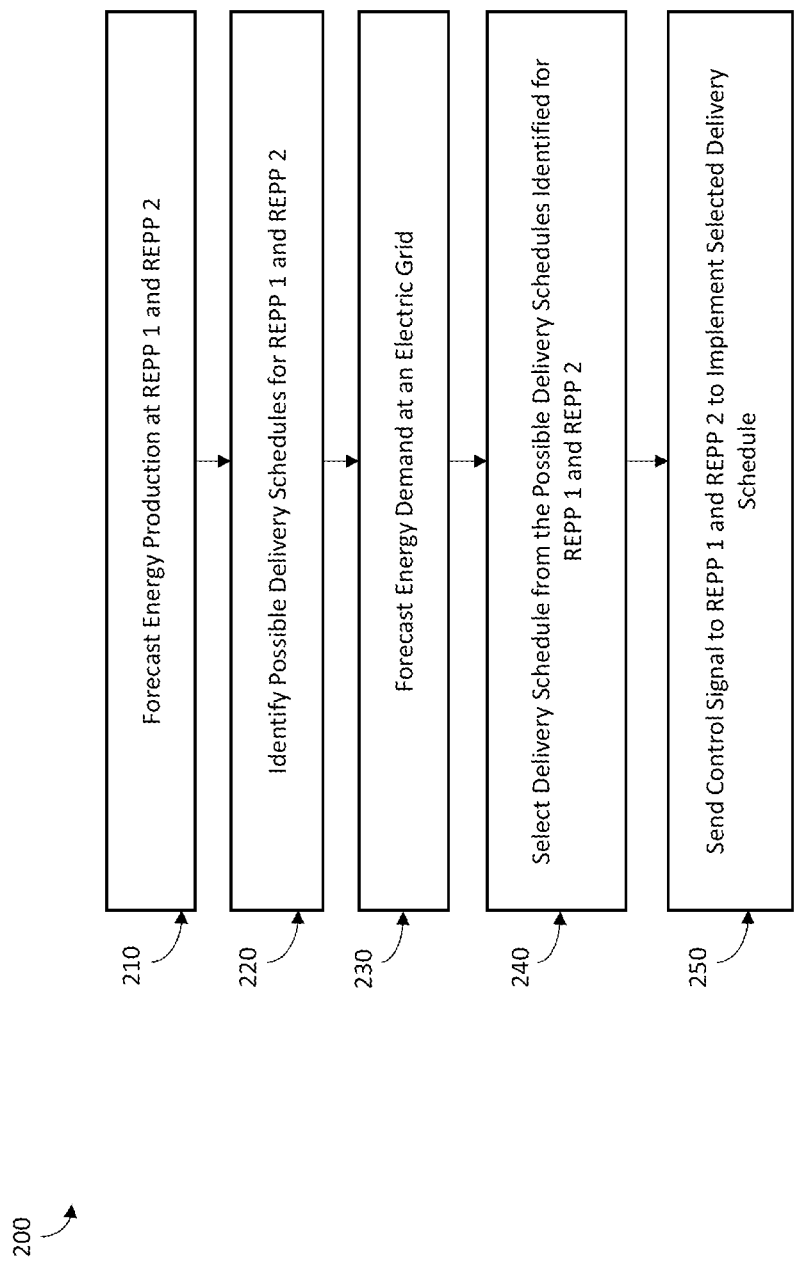
FIG. 2 illustrates a flowchart of an example method for determining an energy delivery schedule for multiple renewable energy power plants (REPPs) connected to an electric grid in accordance with one or more embodiments.

FIG. 2 is a flowchart of an example method 200 for determining an energy delivery schedule for multiple renewable energy power plants (REPPs) connected to an electric grid in accordance with one or more embodiments. Additional, fewer, or different operations may be performed in the method, depending on the embodiment. Further, the operations may be performed in the order shown, concurrently, or in a different order. The method 200 may be performed by a controller (e.g., the REPP operator or any other computing device).

At 210, a controller performs an energy production forecast at a first REPP and a second REPP for a defined time period. The controller may be configured to control energy charge and/or discharge of the first REPP and the second REPP. The energy production forecast considers one or more factors including output capacities, weather conditions and predictions (e.g., wind, sunshine), equipment performance, equipment capacities, and other such parameters. The controller may perform the energy production forecast using profiles of the first REPP and the second REPP. For example, the controller can identify a production capability of the first REPP and the second REPP for different types of renewable energy from stored profiles of the first REPP and the second REPP. The controller can identify a weather forecast in the areas of the first REPP and the second REPP. The controller can determine the energy production forecasts for the first REPP and the second REPP for the defined time period based on the data in the stored profiles for the first REPP and the second REPP.

At 220, the controller identifies one or more possible delivery schedules for the first REPP and the second REPP for a particular time period. The delivery schedules can each indicate times of delivering energy to the energy grid and times of receiving energy from the energy grid. The energy can be delivered and/or received by a first energy storage system (ESS) in the first REPP and a second ESS in the second REPP. The controller can identify separate schedules for the first REPP and the second REPP from memory. The controller can identify the schedules as possible delivery schedules responsive to determining the schedules respectively ensure that, during the time period, the first ESS in the first REPP complies with a first state of charge limit and the second ESS in the second REPP complies with a second state of charge limit. Such state of charge limits may be preconfigured in memory of the controller and/or may be based on the limitations of the REPPs or the ESSs within the REPPs.

In some cases, the controller can combine the possible delivery schedules for the individual REPPs. The controller can do so, for example, by generating combined schedules that indicate times to deliver energy to the energy grid and/or receive energy from the energy grid for the first and second REPPs. The controller can combine the delivery schedules that the controller identified as ensuring the state of charge limits of ESSs of the respective REPPs. The controller can combine individual delivery schedules from the first and second REPPs to generate different permutations of possible schedules. The combined delivery schedules can be possible delivery schedules as described herein.

At 230, the controller performs an energy demand forecast for energy needs associated with the electric grid that is connected to the first REPP and the second REPP. In some embodiments, the controller can determine the energy demand forecast as a function of values for different variables, such as a forecast of the temperature over time of the time period, the time of day, the time year, and/or any other variables that may impact how individuals may consume energy. In one example, the energy demand forecast can be programmed based on time of day or time of year. In another example, the energy forecast can also be based on energy needs due to environmental conditions like unusually hot days. In some embodiments, the controller can receive the energy demand forecast for the locations at which the first REPP and the second REPP are located. The controller can perform the energy demand forecast using any method. In an example implementation, the forecast is a predetermined demand profile under a PPA (or a renewable energy credit (REC) purchase agreement).

At 240, the controller selects a delivery schedule from the one or more possible delivery schedules for the first REPP and the second REPP. The controller can select a combined delivery schedule as described above. In one embodiment, the controller can select a delivery schedule to minimize a measure of risk of not delivering a desired quantity of electricity (e.g., a measure of risk of not delivering the desired quantity of electricity over the course of the time period). The desired quantity of electricity can be based on (e.g., identified in) a PPA or similar arrangement (e.g., a PPA may indicate a required amount of power throughout or at different times of the time period). The controller can identify different possible delivery schedules (e.g., combined delivery schedules) for the first REPP and the second REPP for which a combination of the first REPP and the second REPP are scheduled to provide enough power to satisfy the desired quantity of electricity throughout the time period (e.g., as specified in the PPA or similar arrangement). In some embodiments, the controller can determine a risk for each possible delivery schedule (e.g., each of the possible delivery schedules identified at 220 or, if any, each of the possible delivery schedules identified for being scheduled to provide enough power to satisfy the desired quantity of electricity throughout the time period). The controller can do so, for example, by identifying the amount of energy scheduled to be delivered throughout (e.g., at different points in time or in total) the time period and comparing the identified amount of energy and estimated uncertainty of that amount to the desired amount of energy. In cases in which the desired amount is for different times throughout the time period, the controller can determine and aggregate the differences at the different times. Otherwise, the controller can compare the total amount with the total desired amount to determine a difference. The controller can determine the risk of the possible delivery schedule as the inverse of the difference determined for the possible delivery schedule, for example, or use any other function. The controller can determine a risk or difference for each possible delivery schedule (e.g., combined delivery schedule) and rank the possible delivery schedules based on the risk or difference (e.g., higher ranked possible delivery schedules can correspond with higher differences or lower-level risks). The controller can select the possible delivery schedule responsive to determining the possible delivery schedule has the highest ranking, the highest difference, and/or the lowest risk.

In some embodiments, the controller selects a delivery schedule from the possible delivery schedules (e.g., the combined delivery schedules) responsive to determining the delivery schedule maximizes a measure combining a) a measure of fit between the energy delivered to the grid and energy demand from contracted sources of demand on grid, b) a value score metric for energy projected to be delivered from each REPP (e.g., the first REPP and the second REPP) to other loads during the time period, and c) a value score metric for energy retained in the ESS at each REPP at the end of the time period. For example, the controller can determine a measure of fit, a value score metric for energy projected to be delivered from each REPP, and a value score metric for energy retained in the ESS of the respective REPPs. The controller can determine a total score for each possible delivery schedule based on or as a function of the measure of the determined values. The controller can determine the total scores, for example, using a weighted sum, a weighted average, a sum, an average, a median, or any other function. In some embodiments, the controller can determine and include the measure of risk in determining the total scores for the possible schedules. The controller can rank the possible delivery schedules based on the total scores (e.g., in ascending or descending order). The controller can select the delivery schedule with the highest ranking.

In some embodiments, the controller selects a delivery schedule from the possible delivery schedules responsive to determining the delivery schedule maximizes a measure combining a) a measure of fit between the energy delivered to the grid and energy demand from the grid and b) a value score metric for state of charge at the end of the time period. For example, the controller can determine a measure of fit and a value score metric for a state of charge at the end of the time period for each REPP (e.g., the first REPP and the second REPP) for each of the possible delivery schedules. The controller can determine a total score for each possible delivery schedule based on or as a function of the determined values. The controller can determine the total scores, for example, using a weighted sum, a weighted average, a sum, an average, a median, or any other function. In some embodiments, the controller can determine and include the measure of risk in determining the total scores for the possible schedules. In some embodiments, the controller can determine and include the measure of risk in determining the total scores for the possible schedules. The controller can rank the possible delivery schedules based on the total scores (e.g., in ascending or descending order). The controller can determine a score for and rank each possible delivery schedule based on any combination or permutation of the metrics described herein. The controller can select the delivery schedule with the highest ranking. The controller can determine a score for and rank each possible delivery schedule based on any combination or permutation of the metrics described herein.

At 250, the controller sends a first control signal to the first REPP and a second control signal to the second REPP to implement the selected delivery schedule at the first REPP and the second REPP. The control signals may cause or trigger the first REPP and the second REPP to deliver energy to the energy grid according to the selected delivery schedule, thus ensuring the utility grid can supply loads connected with the energy grid with energy as required by the loads.

In some embodiments, the controller directs the first and second REPPs to deliver a first amount of power to a first load and a second amount of power to a second load. In addition to the first REPP and second REPP, some embodiments include a "virtual power plant" or "virtual REPP" that represents power generated by the first REPP and second REPP in excess of power requirements. In such embodiments, the controller directs the virtual power plant to direct the first amount of power to the second load. The controller may direct the first, second, and virtual REPPs via a network. The first, second, and virtual REPPs may deliver power via a grid. In some embodiments, the controller can deliver the first amount of power to the second load by notifying the second load of the amount of power allocated to the second load. In some embodiments, delivering the second amount of power to the first load includes notifying, by the controller, the first load of the amount of power allocated to the first load.

Figure 3:
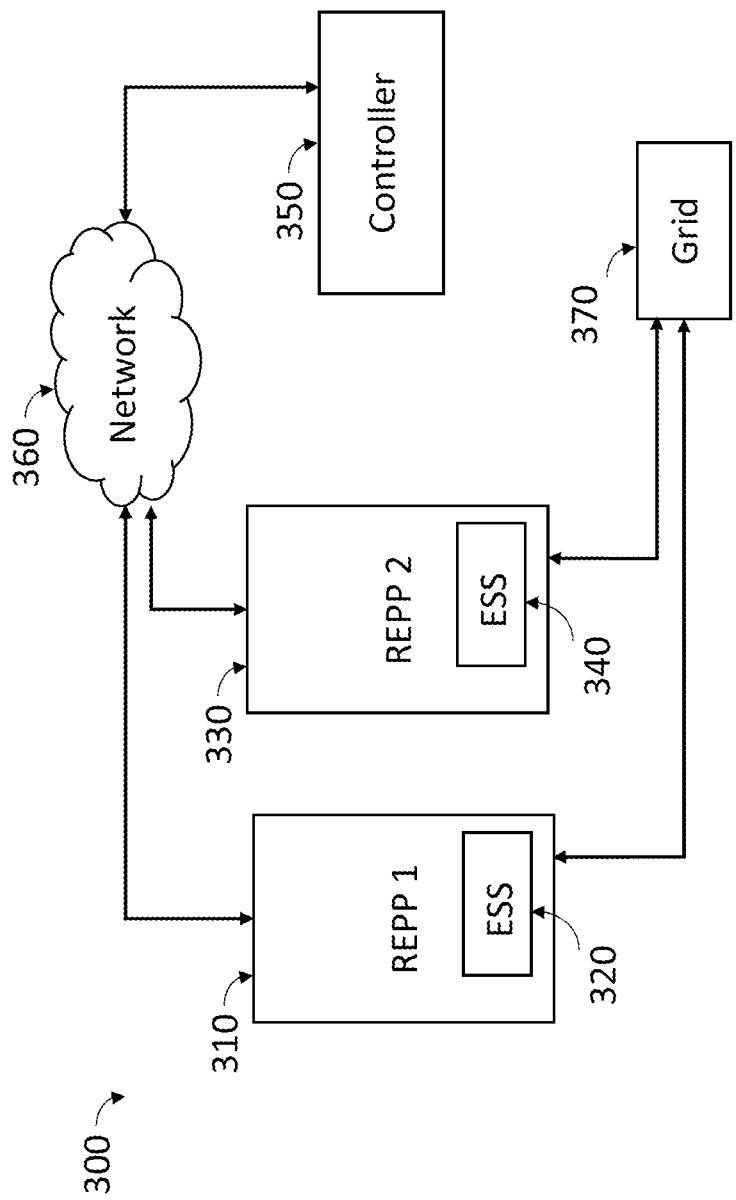
FIG. 3 illustrates an example system that determines an energy delivery schedule for multiple renewable energy power plants (REPPs) connected to an electric grid in accordance with one or more embodiments.

FIG. 3 is an example system 300 that determines an energy delivery schedule for multiple renewable energy power plants (REPPs) connected to an electric grid in accordance with one or more embodiments. System 300 includes a renewable energy power plant (REPP) 310 having an energy storage system (ESS) 320 and a REPP 330 having an ESS 340. In system 300, a controller 350 is coupled to the REPP 310 and REPP 330 by a network 360. The REPP 310 and REPP 330 are both connected to an energy grid 370. The energy grid may be an electric grid, an electrical grid, a utility grid, or any other type of grid configured to transfer energy to and/or from loads and/or energy sources.

The controller 350 includes programmed instructions that when executed cause the controller 350 to forecast energy production by the REPP 310 and the REPP 330 during a time period. Energy production forecasts can be made by the controller 350 using information about the equipment and status at the REPPs as well as weather conditions and forecasts in areas near the REPPs.

The controller 350 identifies one or more possible delivery schedules for the REPP 310 and the REPP 330. The identified one or more possible delivery schedules ensure that during the time period the ESS 320 in the REPP 310 complies with a first state of charge limit and the ESS 340 in the REPP 330 complies with a second state of charge limit.

The controller 350 forecasts energy demand corresponding to points of delivery at the energy grid 370 to which energy produced by the REPP 310 and the REPP 330 is provided (e.g., the respective points of the energy grid at which the REPP 310 and the REPP 330 are connected). Forecasts of energy demand can include expected demand due to time of day, time of year, and weather conditions. Forecasts of energy demand can also include information about expected demand at other power plants.

The controller 350 selects a delivery schedule from the one or more possible delivery schedules for the REPP 310 and the REPP 330 that minimizes a measure of risk of not delivering the desired quantity of electricity. As noted previously, a delivery schedule can be selected to minimize a measure of risk of not delivering the desired quantity of electricity. The desired quantity of electricity can be based on contractual arrangements with third parties both in short and long terms. In another embodiment, a delivery schedule is selected to maximize a measure combining a) a measure of fit between the energy delivered to the grid and energy demand from the grid, b) a value score metric for energy projected to be delivered from each REPP to other loads during the time period, and c) a value score metric for energy retained in the first ESS and the second ESS at each REPP at the end of the time period. In yet another embodiment, a delivery schedule is selected to maximize a measure combining a) a measure of fit between the energy delivered to the grid and energy demand from the grid and b) a value score metric for state of charge at each of the first REPP and the second REPP at the end of the time period.

The controller 350 sends a first control signal to the REPP 310 and a second control signal to the REPP 330 to implement the selected delivery schedule at the REPP 310 and the REPP 330. The control signals can include instructions on the selected delivery schedule including amount of power to deliver, loads to receive the power, and timing on length of power delivery. The control signals can include instructions on offering power to a system operator, where the system operator directly controls amounts of power to deliver.

Figure 4:
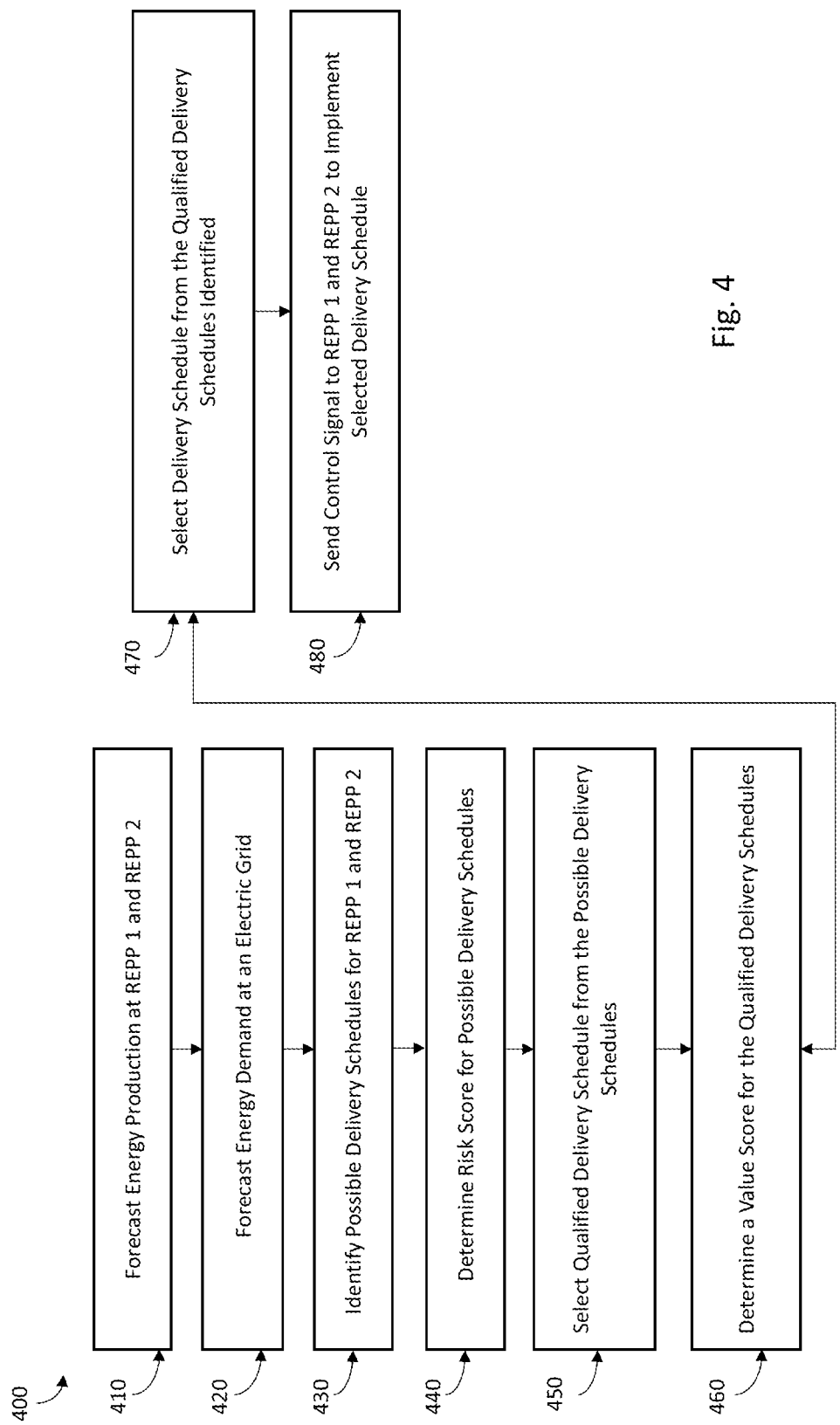
FIG. 4 illustrates another flowchart of an example method for determining an energy delivery schedule for multiple renewable energy power plants (REPPs) connected to an electric grid in accordance with one or more embodiments.

FIG. 4 is a flowchart of an example method 400 for determining an energy delivery schedule for multiple renewable energy power plants (REPPs) connected to an electric grid in accordance with one or more embodiments. Additional, fewer, or different operations may be performed in the method, depending on the embodiment. Further, the operations may be performed in the order shown, concurrently, or in a different order. The method 400 may be performed by a controller (e.g., the REPP operator or any other computing device).

At 410, a controller performs an energy production forecast at a first REPP and a second REPP during a time period. The time period may be minutes, hours, days, months, or more. At 420, the controller performs an energy demand forecast forecasting energy demand corresponding to points of delivery at an electric grid to which energy produced by the first REPP and the second REPP are respectively provided for energy needs associated with the electric grid that is connected to the first REPP and the second REPP. The energy forecast can also be based on energy needs due to environmental conditions like unusually hot days.

At 430, the controller identifies one or more possible delivery schedules for the first REPP and the second REPP. The identified one or more possible delivery schedules ensure that during the time period a first energy storage system (ESS) in the first REPP complies with a first state of charge limit and a second ESS in the second REPP complies with a second state of charge limit. In identifying the possible delivery schedules, the controller can determine or identify combined possible delivery schedules that combine delivery schedules for the first REPP and the second REPP that respectively ensure the first ESS of the first REPP and the second ESS of the second REPP comply with their respective state of charge limits. The combined delivery schedules can be possible delivery schedules, as described herein.

At 440, the controller determines a risk score for each of the one or more possible delivery schedules identified in 430 based at least in part on a measure of the risk that the delivery schedule will result in failure to deliver the committed total energy to the grid. The controller can determine the risk scores for the possible delivery schedules (e.g., the combined possible delivery schedules) in the same manner as described with respect to 240, shown and described with respect to FIG. 2.

At 450, the controller selects one or more qualified delivery schedules (e.g., combined delivery schedules) from the one or more possible delivery schedules. The one or more qualified delivery schedules can have a determined risk score that satisfies a threshold. The threshold can be input by a user. The controller can compare the risk scores to the threshold. The controller can identify any risk scores that are less than the threshold, for example.

At 460, the controller determines a value score for each of the one or more qualified delivery schedules. The controller can determine the value score for the one or more qualified delivery schedules based at least in part on, as a function of, or as being, a measure of fit between the forecasted energy delivery to the grid and the forecasted energy demand for the qualified delivery schedule.

At 470, the controller selects a delivery schedule from the one or more qualified delivery schedules for the first REPP and the second REPP that maximizes the value score. The controller can do so, for example, by ranking the qualified delivery schedules in ascending or descending order based on the value scores for the qualified delivery schedules. The controller can identify and select the highest ranked qualified delivery schedule. In some cases, the controller compares the value scores and selects the qualified delivery schedule with the highest value score.

At 480, the controller sends a first control signal to the first REPP and a second control signal to the second REPP to implement the selected delivery schedule at the first REPP and the second REPP. To do so, the controller can send the first control signal to a first controller operating the first REPP and the second control signal to the second controller operating the second REPP. The first controller can receive the first control signal and the second controller can receive the second control signal. Responsive to receiving the first control signal, the first controller can control charge or discharge of the first ESS of the first REPP according to the first control signal. Responsive to receiving the second control signal, the second controller can control charge or discharge of the second ESS of the second REPP according to the second control signal. Alternatively, a bidding process and dispatch is controlled by the system operator.

Figure 5:
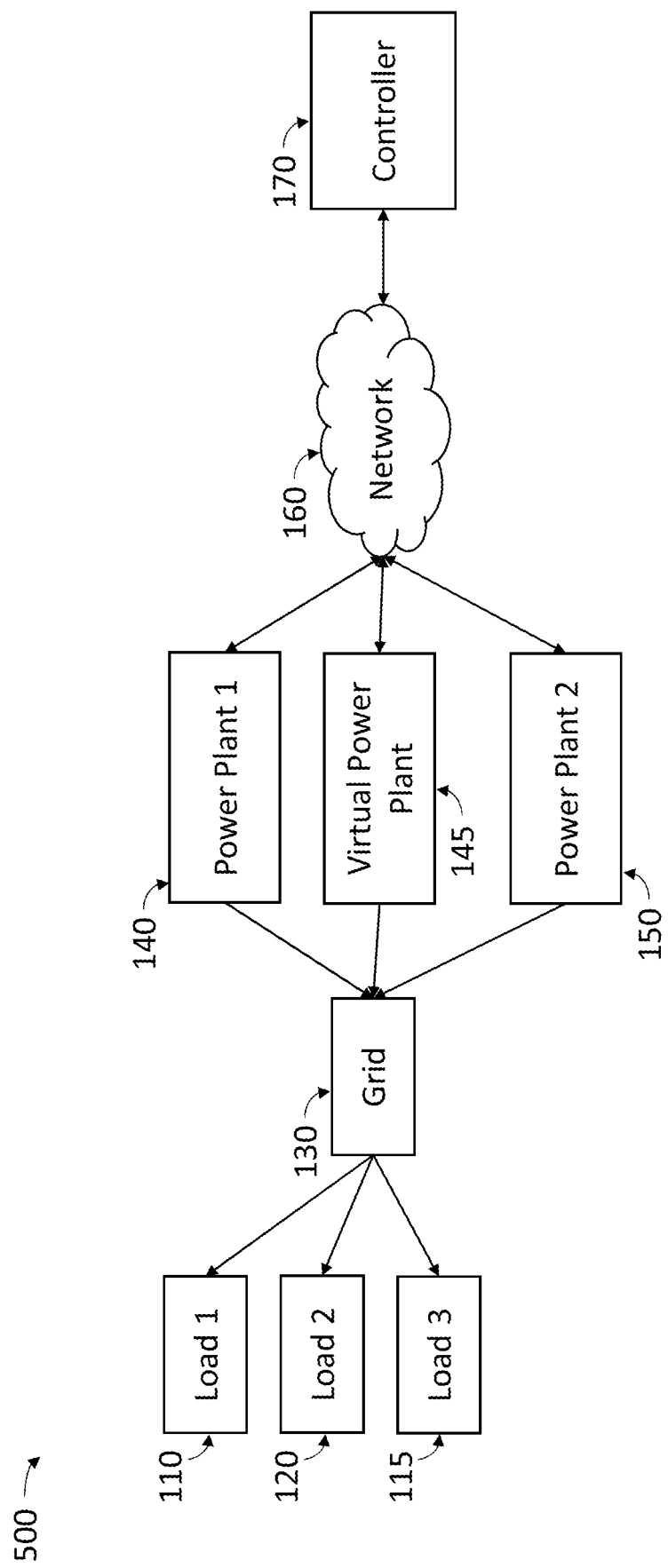
FIG. 5 illustrates another example environment in accordance with one or more embodiments.

FIG. 5 illustrates another example environment 500 in accordance with one or more embodiments. The environment 500 may include a first load 110, a second load 120, and a third load 115. The environment 500 may include a grid 130, a first REPP 140, a second REPP 150, a virtual power plant 145, a network 160, and a controller 170.

The first load 110, the second load 120, and the third load 115 may be electrically coupled to the grid 130. The first load 110, the second load 120, and the third load 115 may be remote from each other and have separate power requirements. The first load 110 may have a first power delivery profile which details power requirements for the first load 110 at different times. The second load 120 may have a second power delivery profile which details power requirements for the second load 120 at different times. The third load 115 may have a third power delivery profile which details power requirements for the third load 115 at different times. In some embodiments, the grid 130 may be a utility grid owned and operated by a single utility or system operator. In other embodiments, the grid 130 may be a plurality of electrical connections allowing for the transmission of power from the first REPP 140 and the second REPP 150 to the first load 110 and the second load 120.

The virtual power plant 145 may represent power generated by the first REPP 140 and the second REPP 150 in excess of power requirements. This excess power may be allocated to different loads, functioning as the virtual power plant 145. For example, the first REPP 140 may deliver power to satisfy the first power delivery profile, the second REPP 150 may deliver power to satisfy the second power delivery profile, and the excess combined power output of the first REPP 140 and the second REPP 150 may serve as the virtual power plant 145 and be allocated to the third load 115 to satisfy the third power delivery profile. The first REPP 140 may have a first power output that varies over time. The second REPP 150 may have a second power output that varies over time. The virtual power plant 145 may have a third power output that varies over time dependent upon the first power output, the second power output, and power requirements imposed upon the first REPP 140 and the second REPP 150. The first power output and the second power output may vary differently such that they are not tightly correlated. For example, the first REPP 140 may be geographically remote from the second REPP 150 such that weather patterns at the first REPP 140 differ from weather patterns at the second REPP 150. Thus, variation in the first power output will not be correlated with variation in the second power output.

The less correlated the output of the first REPP 140 with the output of the second REPP 150, the greater the effects of networking. The less correlated the outputs of the first REPP 140 and the second REPP 150, the less variation will be present in the combined output of the first REPP 140 and the second REPP 150. Less variation in the combined output may result in more reliability in satisfying the power delivery profiles of the first load 110 and the second load 120. Less variation in the combined output may result in lower capacity requirements for the first REPP 140 and the second REPP 150. Less variation in the combined output may result in greater output of the virtual power plant 145.

Similar network advantages may be realized by selecting loads with power requirements that are not tightly correlated. For example, a combined power delivery profile of two loads will have less variability than the individual power delivery profiles of the two loads if the individual power delivery profiles are not tightly correlated. Less variability in the combined power delivery profile allows for the combined power delivery profile to be served by a power plant or network of power plants having less excess capacity. Less variability in the combined power delivery profile allows for a virtual power plant of a network of power plants to have greater output.

The first REPP 140 and the second REPP 150 may communicate with the controller 170 via the network 160. Since the virtual power plant 145 represents excess power output by the first REPP 140 and the second REPP 150, the controller communicates with the virtual power plant 145 by communicating with the first REPP 140 and the second REPP 150. The network 160 may be any local area network (LAN) or wide area network (WAN). In some embodiments, the network is the internet. In other embodiments, the network is a private communications network.

The controller 170 may control the first REPP 140, the second REPP 150, and the virtual power plant 145. The controller 170 may coordinate the first power output of the first REPP 140, the second power output of the second REPP 150, and the third output of the virtual power plant 145 in order to deliver power to the first load 110, the second load 120, and the third load 115. The controller 170 may receive the first power delivery profile of the first load 110, the second power delivery profile of the second load 120, and the third power delivery profile of the third load 115. In some embodiments, the controller 170 receives the first power delivery profile from the first load 110, the second power delivery profile from the second load 120, and the third power delivery profile from the third load 115 via the network 160. In other embodiments, the controller 170 receives the first power delivery profile, the second power delivery profile, and the third power delivery profile from another source. The controller 170 may direct the first REPP 140 to direct power to the first load 110 or the second load 120. The controller 170 may direct the second REPP 150 to direct power to the first load 110 or the second load 120. The controller 170 may direct the first REPP 140 to direct a first portion of its power output to the first load 110 and a second portion of its power output to the second load 120. The controller 170 may direct the second REPP 150 to direct a third portion of its power output to the first load 110 and a fourth portion of its power output to the second load 120. The controller 170 may direct the virtual power plant 145 to direct its power output to the third load.

The controller 170 may direct the first REPP 140 and the second REPP 150 to direct power to the first load 110 and the second load 120 to satisfy the first power delivery profile and the second power delivery profile. If the power output of the first REPP 140 is sufficient to satisfy the first power delivery profile of the first load 110 and the power output of the second REPP 150 is sufficient to satisfy the second power delivery profile of the second load 120, the controller 170 may direct the first REPP 140 to direct sufficient power to the first load 110 to satisfy the first power delivery profile and direct the second REPP 150 to direct sufficient power to the second load 120 to satisfy the second power delivery profile. If the power output of the first REPP 140 is insufficient to satisfy the first power delivery profile of the first load 110 and the power output of the second REPP 150 is sufficient to satisfy the second power delivery profile of the second load 120, the controller 170 may direct the first REPP 140 to direct its power output to the first load 110 and direct the second REPP 150 to direct sufficient power to the second load 120 to satisfy the second power delivery profile and an amount of power to the first load 110 sufficient, when combined with the power output of the first REPP 140, to satisfy the first power delivery profile of the first load 110. Since the power outputs of the first REPP 140 and the second REPP 150 are not tightly correlated, it is likely that if the power output of the first REPP 140 is insufficient to satisfy the first power delivery profile, the second REPP 150 has sufficient power output in excess of what is required by the second power delivery profile to supplement the power output of the first REPP 140 to satisfy the first power delivery profile.

The combined power output of the first REPP 140 and the second REPP 150 which exceeds the first power delivery profile and the second power delivery profile may be directed by the controller 170 from the virtual power plant 145 to satisfy the third power delivery profile of the third load 115. If the combined power output of the first REPP 140 and the second REPP 150 does not exceed the combination of the first power delivery profile and the second power delivery profile, no power may be directed to satisfy the third power delivery profile.

In some embodiments, the first REPP 140 and the second REPP 150 may be selected to be networked. The first REPP 140 and the second REPP 150 may be selected for networking based on a level of correlation between the first power output and the second power output. The first REPP 140 and the second REPP 150 may be selected for networking based on a determination that the first power output and the second power output are the least correlated of a plurality of power outputs of a plurality of power plants. In some embodiments, the first power output is compared to a plurality of power outputs to select the second power output which is the least correlated with the first power output of the plurality of power outputs. In other embodiments, the first REPP 140 and the second REPP 150 may be selected by optimizing for minimized correlation from a plurality of power plants. The controller 170 may select the first REPP 140 and the second REPP 150.

Figure 6:
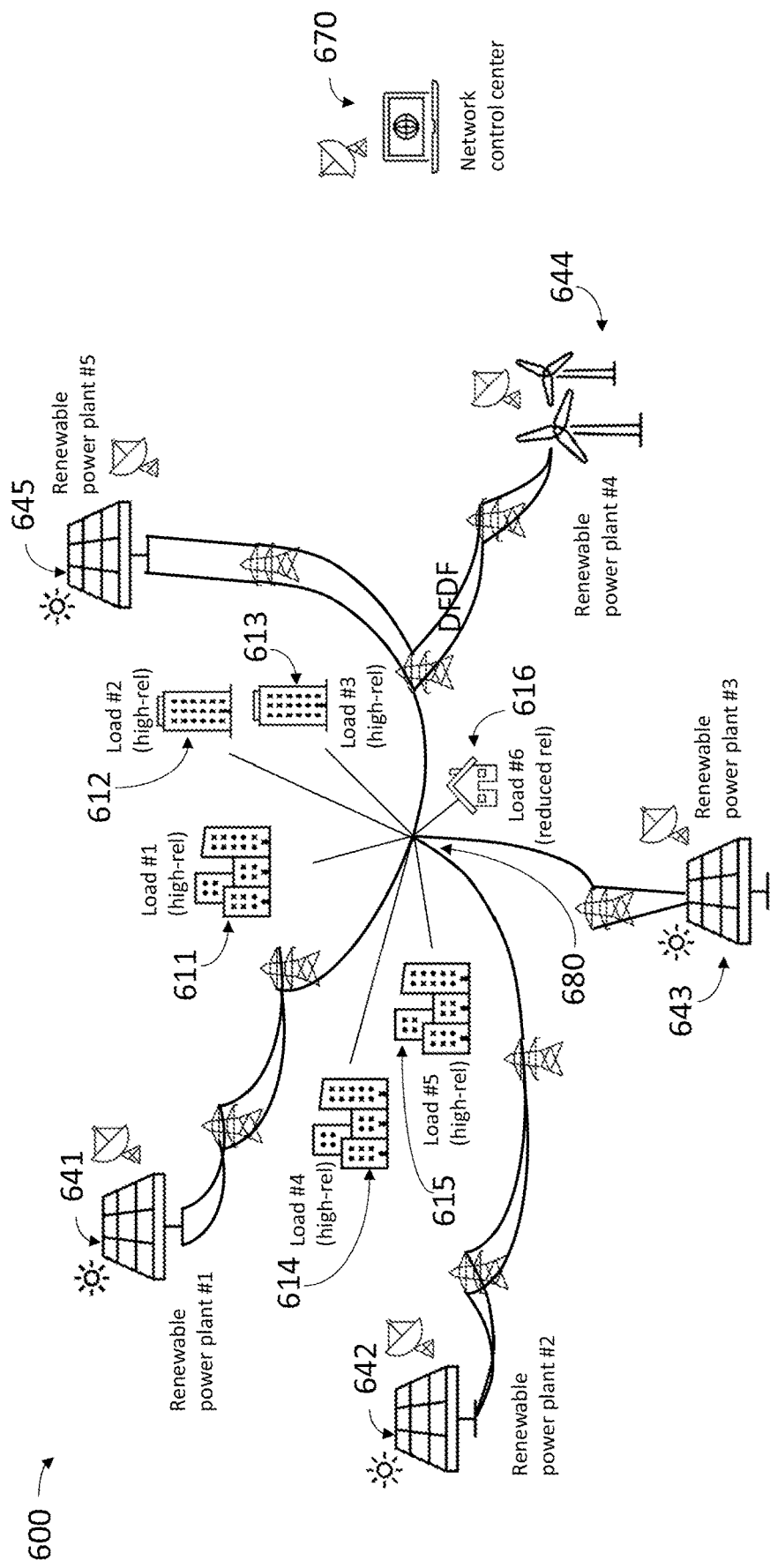
FIG. 6 illustrates another example environment in accordance with one or more embodiments.

FIG. 6 illustrates another example environment 600 in accordance with one or more embodiments. The environment 600 may include a first REPP 641, a second REPP 642, a third REPP 643, a fourth REPP 644, and a fifth REPP 645. The first REPP 641, the second REPP 642, the third REPP 643, and the fifth REPP 645 may be solar power plants and the fourth REPP 644 may be a wind power plant. The REPPs may be in distinct geographical locations and be remote from each other. The outputs of the REPPs may not be tightly correlated. The REPPs may communicate with a controller 670 via a network. The controller 670 may be the controller 670 or play a similar role as the controller 670 of FIG. 5.

The environment 600 may include a first load 611, a second load 612, a third load 613, a fourth load 614, a fifth load 615, and a sixth load 616. The first load 611, the second load 612, the third load 613, the fourth load 614, and the fifth load 615 may be high-reliability loads, such that they require reliable delivery of renewable power. The high-reliability loads may require renewable energy equal to their power requirements or equal to a portion of their power requirements with a reliability above a threshold reliability. The environment 600 may include a sixth load 616. The sixth load 616 may be a low-reliability load, such that it does not require reliable delivery of renewable power. Low-reliability loads may utilize renewable power when it is available and power from other sources when renewable power is not available. The first load 611, the second load 612, the third load 613, the fourth load 614, the fifth load 615, and the sixth load 616 may be electrically coupled to the first REPP 641, the second REPP 642, the third REPP 643, the fourth REPP 644, and the fifth REPP 645 via a grid 680. The grid 680 may be electrically coupled to additional power sources and loads.

In some embodiments, the controller 670 may determine power output setpoints for the REPPs 641-645. Setting the power outputs for the REPPs 641-645 may include receiving a first signal indicating the power delivery profile for the first load 611 and determining setpoints for the REPPs 641-645 such that the combined power output of the REPPs 641-645 is sufficient to satisfy the power delivery profile of the first load 611. The controller 670 may receive a second signal indicating the power delivery profile for the second load 612 and determine setpoints for the REPPs 641-645 such that the combined power output of the REPPs 641-645 is sufficient to satisfy the power delivery profiles of the first load 611 and the second load 612. The controller 670 may receive a signal from each of the loads 611-616 and determine setpoints for the REPPs 641-645 such that the combined power output of the REPPs 641-645 is sufficient to satisfy the power delivery profiles of the loads 611-616.

The REPPs may be networked as discussed herein such that a combined excess output of the REPPs in excess of the requirements of the high-reliability loads functions as a virtual power plant. The virtual power plant may direct power to the sixth load 616.

In an example, if the combined output of the REPPs 641-645 is more than the sum of power delivery profiles of loads 611-616, the controller 670 may set power outputs for the REPPs 641-645 equal to a combined power delivery profile of the loads 611-616. The controller 670 may notify the loads 611-616 that the power delivered to the loads 611-616 from the REPPs 641-645 via the grid was sufficient to satisfy their power delivery profiles.

In another example, if the combined output of the REPPs 641-645 is more than the sum of the power delivery profiles of the loads 611-615, but not more than the sum of the power delivery profiles of the loads 611-616, the controller 670 may set power outputs for the REPPs 641-645 equal to maximum current power outputs for the REPPs 641-645. The controller 670 may allocate power to the loads 611-615 sufficient to satisfy their power delivery profiles and notifies the loads 611-615 that the power delivered to the loads 611-615 was sufficient to satisfy their power delivery profiles. The controller 670 may allocate a remainder of the combined output of the REPPs 641-645 to the sixth load 616 and notifies the sixth load 616 of an amount of the remainder of the combined output of the REPPs 641-645 which was delivered to the sixth load 616.

In yet another example, if the combined output of the REPPs 641-645 is less than the sum of the power delivery profiles of loads 611-615, the controller 670 may set power outputs for the REPPs 641-645 equal to maximum current power outputs for the REPPs 641-645. The controller 670 may allocate power to the loads 611-615 and notify the loads 611-615 of amounts of power delivered to the loads 611-615 and whether the amounts of power delivered to the loads 611-615 were sufficient to satisfy their power delivery profiles. The controller 670 may notify the sixth load 616 that no power was delivered to the sixth load 616 from the REPPs 641-645.

The embodiments disclosed herein represent various technical improvements. The specific implementation of optimal scheduling of energy delivery for one or more renewable energy power plants connected to an electric grid. Previous methods of scheduling energy delivery did not take into account that the renewable energy power plant connected to the grid is a non-preferred location for delivering electricity at a particular time. Previous methods and systems prevented REPP operators from delivering electricity or creating credits at optimal times. The embodiments here described enable a renewable energy producer to choose how much energy is delivered from each of multiple REPPs.

The technical improvement of more efficiently allocating outputs of REPPs enables improved delivery of energy from renewable sources. The REPP operator may determine, ahead of time, how much renewable energy to commit to delivering from each of multiple REPPs. The technical improvement provides for a practical application that REPP operators can submit quantity bids for each of the REPPs to maximize the likelihood of the REPPs being dispatched according to optimal schedules.

Networking power plants to combine their outputs bears significant advantages over conventional systems. Networking power plants to combine their outputs provides the technical improvement of greater reliability of power output. Networking power plants improves the functioning of power plants by reducing the strain of power output fluctuations on individual plants. Networking power plants provides the technical improvement of allowing individual power plants to be built with less excess power output capacity. The practical application of this technical improvement is in reducing the cost of renewable power by building smaller REPPs with less excess power output capacity over power requirements. Networking power plants provides the technical improvement of utilizing excess combined power output as a virtual power plant. This has the practical application of providing renewable power to additional loads using excess power output that would not otherwise be delivered to a load.

In one aspect, the present disclosure describes a method for determining an energy delivery schedule for a first renewable energy power plant (REPP) and a second REPP connected to an energy grid at different points of delivery. The method can include forecasting energy production by a first renewable energy power plant (REPP) and a second REPP during a time period; identifying one or more possible delivery schedules for the first REPP and the second REPP, wherein the identified one or more possible delivery schedules ensure that during the time period a first energy storage system (ESS) in the first REPP complies with a first state of charge limit and a second ESS in the second REPP complies with a second state of charge limit; forecasting a measure of value of energy delivered at the energy grid to which energy produced by the first REPP and the second REPP are respectively provided; selecting a delivery schedule from the one or more possible delivery schedules for the first REPP and the second REPP; and sending a first control signal to the first REPP and a second control signal to the second REPP to implement the selected delivery schedule at the first REPP and the second REPP.

In some embodiments, the selected delivery schedule minimizes a measure of risk of not delivering a desired quantity of electricity. In some embodiments, the selected delivery schedule maximizes a measure combining a) a measure of fit between the energy delivered to the energy grid and energy demand from the energy grid, b) a value score metric for energy projected to be delivered from each REPP to other loads during the time period, and c) a value score metric for energy retained in the first ESS of the first REPP and the second ESS at the second REPP at the end of the time period. In some embodiments, the selected delivery schedule maximizes a measure combining a) a measure of fit between the energy delivered to the energy grid and energy demand from the energy grid and b) a value score metric for state of charge at each of the first REPP and the second REPP at the end of the time period.

In some embodiments, the method further comprises combining a measure of fit between the energy delivered to the energy grid and energy demand from the energy grid and a measure of risk of not delivering a desired quantity of electricity into a score assigned to one of the one or more possible delivery schedules. In some embodiments, the delivery schedule for the first REPP and the second REPP is based on local needs of the energy grid and a best power plant location. In some embodiments, the method further comprises calculating renewable energy credits corresponding to renewable energy produced by the first REPP and the second REPP.

In another aspect, the present disclosure describes a system. The system can include a first renewable energy power plant (REPP) having a first energy storage system (ESS); a second REPP having a second ESS; and a controller coupled to the first REPP and the second REPP and configured to determine an energy delivery schedule for the first REPP and the second REPP connected to an energy grid at different points of delivery. The energy delivery schedule can be determined by forecasting energy production by a first renewable energy power plant (REPP) and a second REPP during a time period; identifying one or more possible delivery schedules for the first REPP and the second REPP, wherein the identified one or more possible delivery schedules ensure that during the time period a first energy storage system (ESS) in the first REPP complies with a first state of charge limit and a second ESS in the second REPP complies with a second state of charge limit; forecasting a measure of value of energy delivered at the energy grid to which energy produced by the first REPP and the second REPP are respectively provided; selecting a delivery schedule from the one or more possible delivery schedules for the first REPP and the second REPP; and sending a first control signal to the first REPP and a second control signal to the second REPP to implement the selected delivery schedule at the first REPP and the second REPP.

In some embodiments, the selected delivery schedule minimizes a measure of risk of not delivering a desired quantity of electricity. In some embodiments, the selected delivery schedule maximizes a measure combining a) a measure of fit between the energy delivered to the energy grid and energy demand from the energy grid, b) a value score metric for energy projected to be delivered from each REPP to other loads during the time period, and c) a value score metric for energy retained in the first ESS and the second ESS at each REPP at the end of the time period. In some embodiments, the selected delivery schedule maximizes a measure combining a) a measure of fit between the energy delivered to the energy grid and energy demand from the energy grid and b) a value score metric for state of charge at each of the first REPP and the second REPP at the end of the time period.

In some embodiments, the controller is further configured to combine a measure of fit between the energy delivered to the energy grid and energy demand from the energy grid and a measure of risk of not delivering a desired quantity of electricity into a score assigned to the delivery schedule. In some embodiments, the delivery schedule for the first REPP and the second REPP is based on local needs of the energy grid and a best power plant location. In some embodiments, the controller is further configured to calculate renewable energy credits corresponding to renewable energy produced by the first REPP and the second REPP.

In another aspect, the present disclosure describes non-transitory computer-readable media comprising computer-executable instructions embodied thereon that, when executed by a processor, cause the processor to perform a process comprising forecasting energy production by a first renewable energy power plant (REPP) and a second REPP during a time period; identifying one or more possible delivery schedules for the first REPP and the second REPP, wherein the identified one or more possible delivery schedules ensure that during the time period a first energy storage system (ESS) in the first REPP complies with a first state of charge limit and a second ESS in the second REPP complies with a second state of charge limit; forecasting a measure of value of energy delivered at an energy grid to which energy produced by the first REPP and the second REPP are respectively provided; selecting a delivery schedule from the one or more possible delivery schedules for the first REPP and the second REPP; and sending a first control signal to the first REPP and a second control signal to the second REPP to implement the selected delivery schedule at the first REPP and the second REPP.

In some embodiments, the selected delivery schedule minimizes a measure of risk of not delivering a desired quantity of electricity. In some embodiments, the selected delivery schedule maximizes a measure combining a) a measure of fit between the energy delivered to the energy grid and energy demand from the energy grid, b) a value score metric for energy projected to be delivered from each REPP to other loads during the time period, and c) a value score metric for energy retained in the first ESS and the second ESS at each REPP at the end of the time period. In some embodiments, delivery schedule maximizes a measure combining a) a measure of fit between the energy delivered to the energy grid and energy demand from the energy grid and b) a value score metric for state of charge at each of the first REPP and the second REPP at the end of the time period.

In some embodiments, the process further comprises combining a measure of fit between the energy delivered to the energy grid and energy demand from the energy grid and a measure of risk of not delivering a desired quantity of electricity into a score assigned to the delivery schedule. In some embodiments, the delivery schedule for the first REPP and the second REPP is based on local needs of the energy grid and a best power plant location. In some embodiments, the process further comprises calculating renewable energy credits corresponding to renewable energy produced by the first REPP and the second REPP.

In another aspect, the present disclosure describes a method for determining an energy delivery schedule for a first renewable energy power plant (REPP) and a second REPP connected to an energy grid at different points of delivery. The method can include forecasting energy production by a first renewable energy power plant (REPP) and a second REPP during a time period; forecasting energy demand corresponding to points of delivery at the energy grid to which energy produced by the first REPP and the second REPP are respectively provided; identifying one or more possible delivery schedules for the first REPP and the second REPP; determining a risk score for each of the one or more possible delivery schedules based at least in part on a measure of the risk that the delivery schedule will result in failure to deliver the committed total energy to the energy grid; selecting one or more qualified delivery schedules from the one or more possible delivery schedules, wherein the one or more qualified delivery schedules have a determined risk score that satisfies a threshold; determining a value score for each of the one or more qualified delivery schedules based at least in part on a measure of fit between the forecasted energy delivery to the energy grid and the forecasted energy demand; selecting a delivery schedule from the one or more qualified delivery schedules for the first REPP and the second REPP that maximizes the value score; and sending a first control signal to the first REPP and a second control signal to the second REPP to implement the selected delivery schedule at the first REPP and the second REPP.

In an illustrative embodiment, any of the operations described herein can be implemented at least in part as computer-readable instructions stored on a computer-readable memory. Upon execution of the computer-readable instructions by a processor, the computer-readable instructions can cause a node, such as a computing node or a power plant node, to perform the operations.

With respect to the use of substantially any plural and/or singular terms herein, those having skill in the art can translate from the plural to the singular and/or from the singular to the plural as is appropriate to the context and/or application. The various singular/plural permutations may be expressly set forth herein for sake of clarity.

The foregoing description of illustrative embodiments has been presented for purposes of illustration and of description. It is not intended to be exhaustive or limiting with respect to the precise form disclosed, and modifications and variations are possible in light of the above teachings or may be acquired from practice of the disclosed embodiments. It is intended that the scope of the invention be defined by the claims appended hereto and their equivalents.

The foregoing outlines features of several embodiments so that those skilled in the art may better understand the aspects of the present disclosure. Those skilled in the art should appreciate that they may readily use the present disclosure as a basis for designing or modifying other processes and structures for carrying out the same purposes and/or achieving the same advantages of the embodiments introduced herein. Those skilled in the art should also realize that such equivalent constructions do not depart from the spirit and scope of the present disclosure, and that they may make various changes, substitutions, and alterations herein without departing from the spirit and scope of the present disclosure.

What is claimed is:

1. A method for determining an energy delivery schedule for a first renewable energy power plant (REPP) and a second REPP connected to an energy grid at different points of delivery, the method comprising:
   forecasting energy production by a first renewable energy power plant (REPP) and a second REPP during a time period;
   identifying two or more possible delivery schedules for the first REPP and the second REPP, wherein the identified two or more possible delivery schedules ensure that during the time period a first energy storage system (ESS) in the first REPP complies with a first state of charge limit and a second ESS in the second REPP complies with a second state of charge limit;
   forecasting a measure of value of energy delivered at the energy grid to which energy produced by the first REPP and the second REPP are respectively provided;
   selecting a delivery schedule from the two or more possible delivery schedules for the first REPP and the second REPP, wherein the selected delivery schedule is selected based on minimizing a measure of risk of not delivering a desired quantity of electricity; and
   sending a first control signal to the first REPP and a second control signal to the second REPP to implement the selected delivery schedule at the first REPP and the second REPP, wherein the first control signal and the second control signal provide separate control of the first REPP and the second REPP.

2. The method of claim 1, wherein the selected delivery schedule is selected based on maximizing a measure combining a) a measure of fit between the energy delivered to the energy grid and energy demand from customer loads connected to the energy grid, b) a value score metric for energy projected to be delivered from each REPP to other loads during the time period, and c) a value score metric for energy retained in the first ESS of the first REPP and the second ESS at the second REPP at the end of the time period.

3. The method of claim 1, wherein the selected delivery schedule is selected based on maximizing a measure combining a) a measure of fit between the energy delivered to the energy grid and energy demand from customer loads connected to the energy grid and b) a value score metric for state of charge at each of the first REPP and the second REPP at the end of the time period.

4. The method of claim 1, further comprising combining a measure of fit between the energy delivered to the energy grid and energy demand from the energy grid and a measure of risk of not delivering a desired quantity of electricity into a score assigned to one of the two or more possible delivery schedules.

5. The method of claim 1, wherein the delivery schedule for the first REPP and the second REPP is based on local needs of the energy grid.

6. The method of claim 1, further comprising calculating renewable energy credits corresponding to renewable energy produced by the first REPP and the second REPP.

7. A system comprising:
a first renewable energy power plant (REPP) having a first energy storage system (ESS);
a second REPP having a second ESS; and
a controller coupled to the first REPP and the second REPP and configured to determine an energy delivery schedule for the first REPP and the second REPP connected to an energy grid at different points of delivery, wherein the energy delivery schedule is determined by:
forecasting energy production by a first renewable energy power plant (REPP) and a second REPP during a time period;
identifying two or more possible delivery schedules for the first REPP and the second REPP, wherein the identified two or more possible delivery schedules ensure that during the time period a first energy storage system (ESS) in the first REPP complies with a first state of charge limit and a second ESS in the second REPP complies with a second state of charge limit;
forecasting a measure of value of energy delivered at the energy grid to which energy produced by the first REPP and the second REPP are respectively provided;
selecting a delivery schedule from the two or more possible delivery schedules for the first REPP and the second REPP, wherein the selected delivery schedule is selected based on minimizing a measure of risk of not delivering a desired quantity of electricity; and
sending a first control signal to the first REPP and a second control signal to the second REPP to implement the selected delivery schedule at the first REPP and the second REPP.

8. The system of claim 7, wherein the selected delivery schedule is selected based on minimizing a measure of risk of not delivering a desired quantity of electricity.

9. The system of claim 7, wherein the selected delivery schedule is selected based on maximizing a measure combining a) a measure of fit between the energy delivered to the energy grid and energy demand from the energy grid, b) a value score metric for energy projected to be delivered from each REPP to other loads during the time period, and c) a value score metric for energy retained in the first ESS and the second ESS at each REPP at the end of the time period.

10. The system of claim 7, wherein the selected delivery schedule is selected based on maximizing a measure combining a) a measure of fit between the energy delivered to the energy grid and energy demand from the energy grid and b) a value score metric for state of charge at each of the first REPP and the second REPP at the end of the time period.

11. The system of claim 7, wherein the controller is further configured to combine a measure of fit between the energy delivered to the energy grid and energy demand from the energy grid and a measure of risk of not delivering a desired quantity of electricity into a score assigned to the delivery schedule.

12. The system of claim 7, wherein the delivery schedule for the first REPP and the second REPP is based on local needs of the energy grid.

13. The system of claim 7, wherein the controller is further configured to calculate renewable energy credits corresponding to renewable energy produced by the first REPP and the second REPP.

14. Non-transitory computer-readable media comprising computer-executable instructions embodied thereon that, when executed by a processor, cause the processor to perform a process comprising:
forecasting energy production by a first renewable energy power plant (REPP) and a second REPP during a time period;
identifying two or more possible delivery schedules for the first REPP and the second REPP, wherein the identified two or more possible delivery schedules ensure that during the time period a first energy storage system (ESS) in the first REPP complies with a first state of charge limit and a second ESS in the second REPP complies with a second state of charge limit;
forecasting a measure of value of energy delivered at an energy grid to which energy produced by the first REPP and the second REPP are respectively provided;
selecting a delivery schedule from the two or more possible delivery schedules for the first REPP and the second REPP, wherein the selected delivery schedule is selected based on minimizing a measure of risk of not delivering a desired quantity of electricity; and
sending a first control signal to the first REPP and a second control signal to the second REPP to implement the selected delivery schedule at the first REPP and the second REPP.

15. The non-transitory computer-readable media of claim 14, wherein the selected delivery schedule is selected based on minimizing a measure of risk of not delivering a desired quantity of electricity.

16. The non-transitory computer-readable media of claim 14, wherein the selected delivery schedule is selected based on maximizing a measure combining a) a measure of fit between the energy delivered to the energy grid and energy demand from the energy grid, b) a value score metric for energy projected to be delivered from each REPP to other loads during the time period, and c) a value score metric for energy retained in the first ESS and the second ESS at each REPP at the end of the time period.

17. The non-transitory computer-readable media of claim 14, wherein the selected delivery schedule is selected based on maximizing a measure combining a) a measure of fit between the energy delivered to the energy grid and energy demand from the energy grid and b) a value score metric for state of charge at each of the first REPP and the second REPP at the end of the time period.

18. The non-transitory computer-readable media of claim 14, further comprising combining a measure of fit between the energy delivered to the energy grid and energy demand from the energy grid and a measure of risk of not delivering a desired quantity of electricity into a score assigned to the delivery schedule.

19. The non-transitory computer-readable media of claim 14, wherein the delivery schedule for the first REPP and the second REPP is based on local needs of the energy grid.

20. The non-transitory computer-readable media of claim 14, further comprising calculating renewable energy credits corresponding to renewable energy produced by the first REPP and the second REPP.

21. A method for determining an energy delivery schedule for a first renewable energy power plant (REPP) and a second REPP connected to an energy grid at different points of delivery, the method comprising:
forecasting energy production by a first renewable energy power plant (REPP) and a second REPP during a time period;

forecasting a measure of value of energy delivered at the energy grid to which energy produced by the first REPP and the second REPP are respectively provided;

identifying two or more possible delivery schedules for the first REPP and the second REPP;

determining a risk score for each of the two or more possible delivery schedules based at least in part on a measure of the risk that the delivery schedule will result in failure to deliver the committed total energy to the energy grid;

selecting two or more qualified delivery schedules from the two or more possible delivery schedules, wherein the two or more qualified delivery schedules have a determined risk score that satisfies a threshold;

determining a value score for each of the two or more qualified delivery schedules based at least in part on a measure of fit between the forecasted energy delivery to the energy grid and the forecasted energy demand;

selecting a delivery schedule from the two or more qualified delivery schedules for the first REPP and the second REPP that maximizes the value score, wherein the selected delivery schedule is selected based on minimizing a measure of risk of not delivering a desired quantity of electricity; and sending a first control signal to the first REPP and a second control signal to the second REPP to implement the selected delivery schedule at the first REPP and the second REPP.

* * * * *